United States Patent
Gomi

(10) Patent No.: US 8,384,008 B2
(45) Date of Patent: Feb. 26, 2013

(54) SOLID STATE IMAGING DEVICE TO REDUCE POWER CONSUMPTION

(75) Inventor: Yuichi Gomi, Tokyo (JP)

(73) Assignee: Olympus Corporation, Tokyo (JP)

( * ) Notice: Subject to any disclaimer, the term of this patent is extended or adjusted under 35 U.S.C. 154(b) by 552 days.

(21) Appl. No.: 12/632,343

(22) Filed: Dec. 7, 2009

(65) Prior Publication Data

US 2010/0140454 A1    Jun. 10, 2010

(30) Foreign Application Priority Data

Dec. 8, 2008   (JP) .................................. 2008-312726

(51) Int. Cl.
*H01L 27/00* (2006.01)
(52) U.S. Cl. .................... 250/214.1; 250/208.1; 348/308
(58) Field of Classification Search ............... 250/208.1, 250/214.1; 348/308
See application file for complete search history.

(56) References Cited

U.S. PATENT DOCUMENTS

2002/0000508 A1 *  1/2002  Muramatsu et al. ....... 250/208.1
2005/0083422 A1 *  4/2005  Lee et al. ..................... 348/308

FOREIGN PATENT DOCUMENTS

| JP | 2004-111590 A | 4/2004 |
| JP | 2005-042714 A | 2/2005 |
| JP | 2005-333265 A | 12/2005 |

OTHER PUBLICATIONS

Japanese Office Action dated Dec. 18, 2012, issued in corresponding Japanese Patent Application No. 2008-312726, with English Translation (4 pages).

* cited by examiner

*Primary Examiner* — Tony Ko
(74) *Attorney, Agent, or Firm* — Westerman, Hattori, Daniels & Adrian, LLP

(57) ABSTRACT

A solid state imaging device comprises a pixel unit, a first controller, and a second controller. The pixel unit has a two dimensional matrix of pixels and each of the pixels is arrayed in the matrix. The first controller independently controls the output unit row by row. The second controller independently controls the first reset unit row by row. The each of pixels comprises a photoelectric conversion element, a first reset unit, a charge retention unit, a transmitter, a second reset unit, and an output unit. The element converts incident light into a signal charge and accumulates the converted signal charge. The first reset unit resets the signal charge. The charge retention unit retains a signal charge output from the photoelectric conversion element. The transmitter transmits the signal charge to the charge retention unit. The second reset unit resets the signal charge. The output unit outputs a pixel signal in response to the signal charge to a vertical signal line.

1 Claim, 8 Drawing Sheets

SOLID STATE IMAGING DEVICE TO REDUCE POWER CONSUMPTION

BACKGROUND OF THE INVENTION

1. Field of the Invention

The present invention relates to a solid state imaging device in which a plurality of pixels having a photoelectric conversion element, which converts input light into signal charges and accumulates the converted signal charges, are arranged.

Priority is claimed on Japanese Patent Application No. 2008-312726, filed Dec. 8, 2008, the content of which is incorporated herein by reference.

2. Description of Related Art

In the related art, a Metal Oxide Semiconductor (MOS) type solid state imaging device, which uses pixels having an amplification and reading function, is known. FIG. 5 shows the structure of a pixel of a MOS type solid state imaging device. As shown in FIG. 5, a single pixel 100a includes a photodiode 101, a transmission transistor 102, a charge retention (or Floating Diffusion (FD)) section 103, an FD reset transistor 104, an amplification transistor 105, and a selection transistor 106.

The photodiode 101 is photoelectric conversion element that converts input light into a signal charge and accumulates the converted signal charge.

The transmission transistor 102 sends the signal charge, accumulated in the photodiode 101, to the FD section 103. The FD section 103 maintains the signal charge, which is sent from the photodiode 101 by the transmission transistor 102. The FD reset transistor 104 resets the signal charge in the photodiode 101 and the FD section 103. The amplification transistor 105 amplifies the level of a voltage of the FD section 103 and outputs the amplified voltage as a pixel signal. The selection transistor 106 outputs the pixel signal to a vertical signal line 114 when the pixel 100a is selected as a pixel that reads out a signal charge. Herein, other components except for the photodiode 101 are shaded from light.

Inside the pixel 100a, a pixel power line 110, an FD reset line 111, a transmission line 112, and a selection line 113, as well as the vertical signal line 114, are arranged. The pixel power line 110 is a signal line for applying a supply voltage VDD, and is electrically connected to a drain side of the amplification transistor 105 and to a drain side of the FD reset transistor 104. The FD reset line 111 is a signal line for applying FD reset pulses φRMi (i=1 to m), which are for resetting FD sections 103 of one row, and is connected to gates of FD reset transistors 104 of one row.

The transmission line 112 is a signal line for applying row transmission pulses φTRi (i=1 to m), which are for sending signal charges of pixels of one row to the FD section 103 of each pixel, and is electrically connected to gates of transmission transistors 102 of the pixels of one row. The selection line 113 is a signal line for applying row selection pulses φSEi (i=1 to m), which are for selecting pixels of one row that read out pixel signals, and is electrically connected to gates of selection transistors 106 of the pixels of one row. Due to the structure of the pixel using the four transistors, a photoelectric conversion function, a reset function, an amplification and reading function, a temporary memory function, and a selection function are realized.

The MOS type solid state imaging device has a pixel array in which pixels having the above-described structure are arrayed in a matrix consisting of m rows×n columns. The MOS type solid state imaging device uses a typical XY address reading method, which reads pixel signals from all of the pixels by reading pixel signals in a per row by sequentially selecting each row from first row to mth row using a vertical scanning circuit and a horizontal scanning circuit (not shown).

In the typical XY address reading method, timings for sending signal charges to the FD sections 103 are different for each row. In more detail, in the first row in which the signal charges are initially read out and in the mth row in which the signal charges are read out for the last time, the greatest difference in the timings for reading the respective rows is as much as one frame. This causes a problem in that the image of a moving object is distorted if taken at high speed.

As an approach to solve the foregoing problem in the typical XY address reading method, there is a global shutter reading method. The global shutter reading method will be described hereinafter with reference to FIG. 6. First, photodiodes 101 of pixels of all of the rows are reset by simultaneously outputting FD reset pulses φRM1 to φRMm and row transmission pulses φTR1 to φTRm of all of the rows from a vertical scanning circuit (not shown). Subsequently, after a signal accumulation period (i.e., an exposure period) is passed, the row transmission pulses φTR1 to φTRm of all of the rows are simultaneously output from the vertical scanning circuit, and signal charges of the photodiodes 101 of the pixels of all of the rows, accumulated in the exposure period, are simultaneously sent to the FD sections 103. The operation of a global shutter is performed in the above described processing.

In addition, in the pixel structure as shown in FIG. 5, when strong light is incident on the photodiode 101, a signal charge equal to or more than the maximum amount of charge, which can be charged in the photodiode 101, is generated. This causes the problem of the so-called "blooming," in which the signal charge flows out from the photodiode 101 and spills into the FD section 103, adjacent pixels, or the like through the transmission transistor 102 or a channel stop area. The "blooming" also occurs in the case of performing a global shutter operation by once sending the signal charges obtained by the photodiodes 101 to the FD sections 103, simultaneously across all of the pixels.

When the "blooming" occurs, a white stripe shape or a white circular pattern is observed in a photographing image, thereby degrading image quality. In the case of performing the global shutter operation, after the signal charge is sent to the FD section 103, an excessive charge occurred in the photodiode 101 also overflows into the FD section 103 in the pixel thereof. The excessive charge is then added to the signal charge sent to the FD section 103, thereby destroying the signal. This, as a result, increases the influence of the blooming.

As a method for suppressing the blooming from occurring in the case of performing the global shutter operation, there are the following methods. Specifically, Japanese Unexamined Patent Application Publication No. 2004-111590 and Japanese Unexamined Patent Application Publication No. 2005-42714 disclose a circuit structure shown in FIG. 7. With respect to the pixel 100a shown in FIG. 5, a Photodiode (PD) reset transistor 107, which directly resets the photodiode 101, is added to a pixel 100b, as shown in FIG. 7. In addition, a PD reset line 115, which applies a PD reset pulse φRPDi (i=1 to m) for resetting photodiodes 101 of one row, is added. The PD reset line 115 is connected to gates of PD reset transistors 107 of one row. In the disclosure of Japanese Unexamined Patent Application Publication No. 2004-111590 and Japanese Unexamined Patent Application Publication No. 2005-42714, a charge occurred in the photodiode 101 is output to the pixel power line 110 by turning on the PD reset transistor 107 using such a circuit structure, except for the exposure period.

Below, the operation of this method is explained with reference to FIG. 8. First, PD reset pulses φRPD1 to φRPDm of all of the rows, output from the vertical scanning circuit (not shown), are simultaneously converted from "H" level to "L" level, and the reset of the photodiodes 101 of the pixels of all of the rows is canceled, so that accumulation begins. Subsequently, after a certain signal accumulation period (i.e., an exposure period) is passed, row transmission pulses φTR1 to φTRm of all of the rows are simultaneously output from the vertical scanning circuit, so that the signal charges, accumulated in the photodiodes 101 of the pixels of all of the rows in the exposure period, are simultaneously sent to the FD sections 103.

Afterwards, selection pulses φSEi are sequentially input row by row, and pixel signals are read out row by row using a horizontal reading circuit (not shown). Before these pixel signals are read out, the PD reset pulses φRPD1 to φRPDm of all of the rows are simultaneously converted from "L" level to "H" level. Accordingly, the photodiodes 101 of the pixels of all of the rows are reset, and the charges occurred in the photodiodes 101 are discharged to the pixel power lines 110.

SUMMARY

In one aspect of the present invention, there is provided a solid state imaging device that includes at least: a pixel unit which has a two dimensional matrix of pixels, in which each of the pixels arrayed in the matrix comprises; a photoelectric conversion element which converts incident light into a signal charge and accumulates the converted signal charge, a first reset unit which resets the signal charge accumulated in the photoelectric conversion element, a charge retention unit which retains a signal charge output from the photoelectric conversion element, a transmitter which transmits the signal charge accumulated in the photoelectric conversion element to the charge retention unit, a second reset unit which resets the signal charge retained in the charge retention unit, and an output unit which outputs a pixel signal in response to the signal charge, retained in the charge retention unit, to a vertical signal line; a first controller which independently controls the output unit row by row; and a second controller which independently controls the first reset unit row by row.

Moreover, preferably in the solid state imaging device according to the present invention, the first controller may control the output unit row by row so that pixel signals are sequentially output row by row to the vertical signal line, and the second controller may control the first reset unit row by row so as to reset the photoelectric conversion element when the pixel signals are output and to cancel the reset state of the photoelectric conversion element after the output of the pixel signals is completed.

BRIEF DESCRIPTION OF THE DRAWINGS

The above features and advantages of the present invention will be more apparent from the following detailed description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Exemplary embodiments of the invention will now be described hereinafter with reference to the accompanying drawings.

First Embodiment

Figure 1:
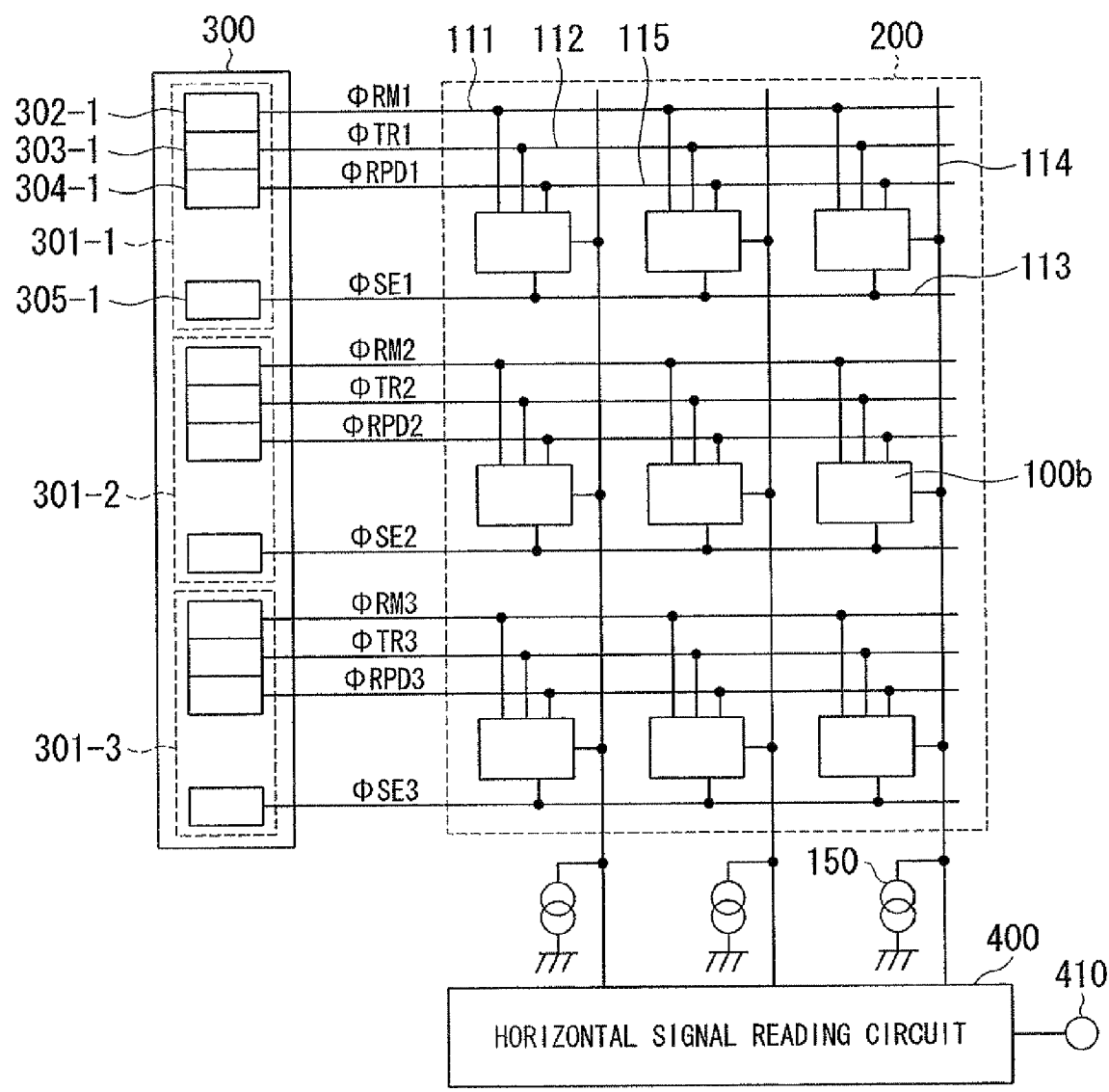
FIG. 1 is a block diagram showing the structure of a solid state imaging device in accordance with a first exemplary embodiment of the invention.
Figure 7:
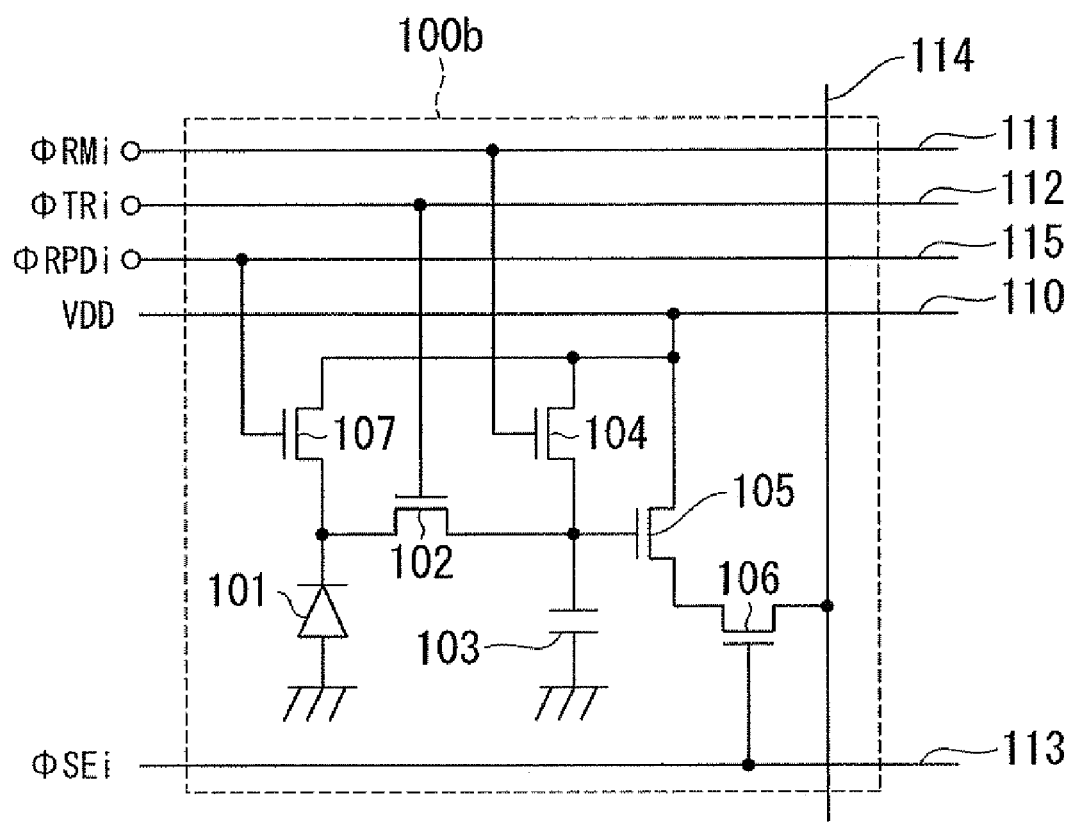
FIG. 7 is a block diagram showing the structure of a MOS solid state imaging device of the related art.
Figure 8:
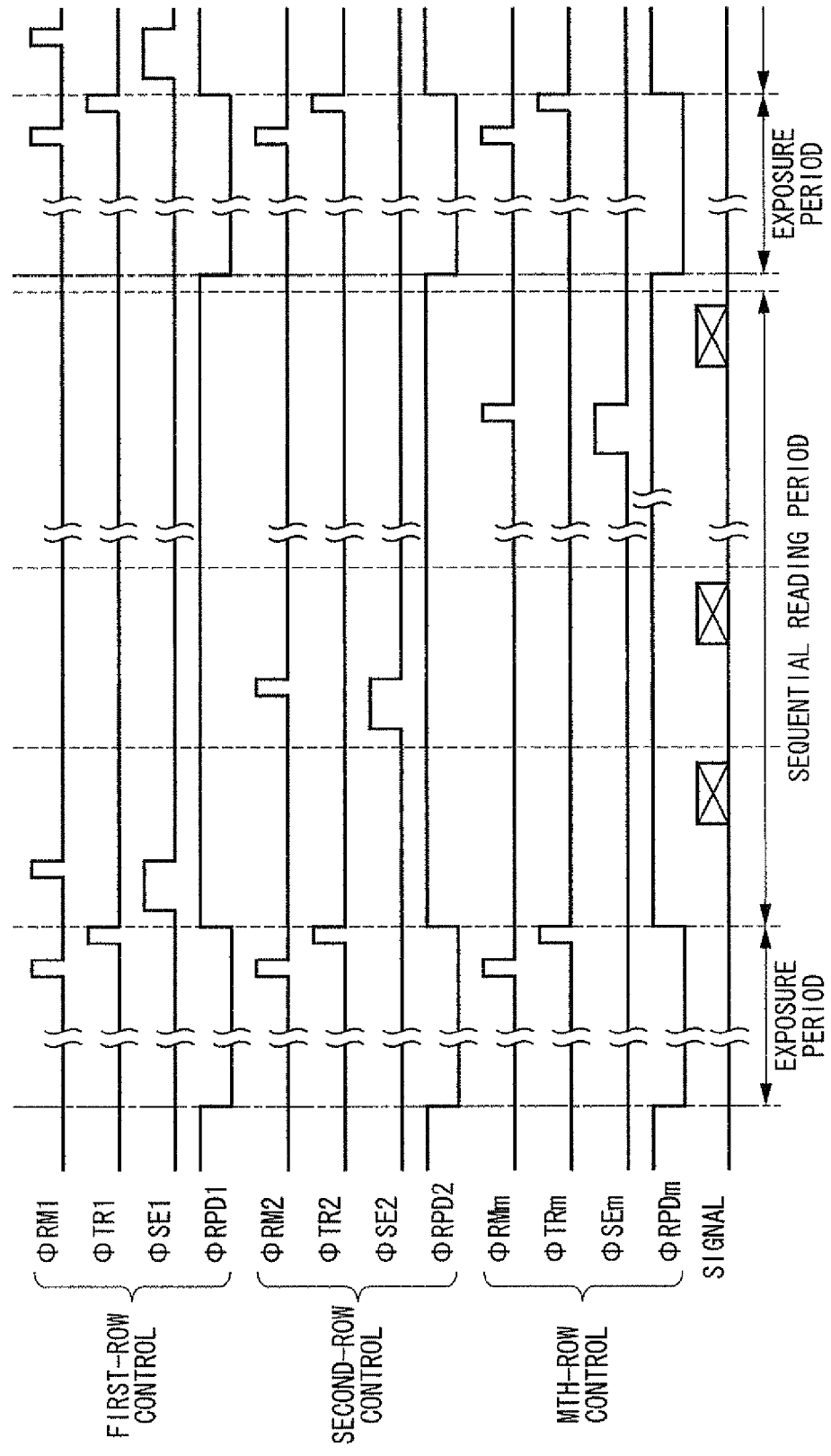
FIG. 8 is a timing chart showing the operation of the MOS solid state imaging device of the related art.

First, a description will be given of a first exemplary embodiment of the invention. FIG. 1 shows the structure of a solid state imaging device in accordance with this embodiment of the invention. The solid state imaging device shown in FIG. 1 includes a pixel unit 200, a vertical scanning circuit 300, a horizontal signal reading circuit 400, and a power supply 150. The pixel unit 200 has a structure in which pixels 100b are arranged in the form of a 3×3 matrix. Description of the pixels 100b will be omitted since they have the same structure as shown in FIG. 7.

The vertical scanning circuit 300 controls the driving of the pixel unit 200 with respect to each row. In order to perform the driving control, the vertical scanning circuit 300 includes unit circuits 301-1, 301-2, and 301-3, the number of which is the same as that of the rows.

In addition, each unit circuit includes a controller 302-$i$, a controller 303-$i$, a controller 304-$i$ (a second controller), and a controller 305-$i$ (a first controller), where i is 1 to 3.

The controller 302-$i$ controls, row by row, FD reset pulses φRMi (i=1 to 3) for independently resetting FD sections 103 of one row. The controller 303-$i$ independently controls, row by row, row transmission pulses φTRi (i=1 to 3), which are for transmitting signal charges of pixels of one row to FD sections 103 of each pixel. The controller 304-$i$ independently controls, row by row, PD reset pulses φRPDi (i=1 to 3) for resetting photodiodes 101 of one row. The controller 305-$i$ independently controls, row by row, row selection pulses φSEi (i=1 to 3) for selecting pixels of one row, which are for reading the pixel signals. The pixel signals of the pixels of the row selected by the row selection pulse φSEi are designed to be output to vertical signal lines 114, each of which is provided in every column.

The pixel signals of one row, output to the vertical signal lines 114, are output from an output terminal 410 by the horizontal signal reading circuit 400, in a time series in which the pixel signals are horizontally aligned in order. While FIG. 1 shows FD reset lines 111, transmission lines 112, selection lines 113, vertical signal lines 114, and PD reset lines 115, pixel power lines supplying a supply voltage VDD are not shown.

Figure 2:
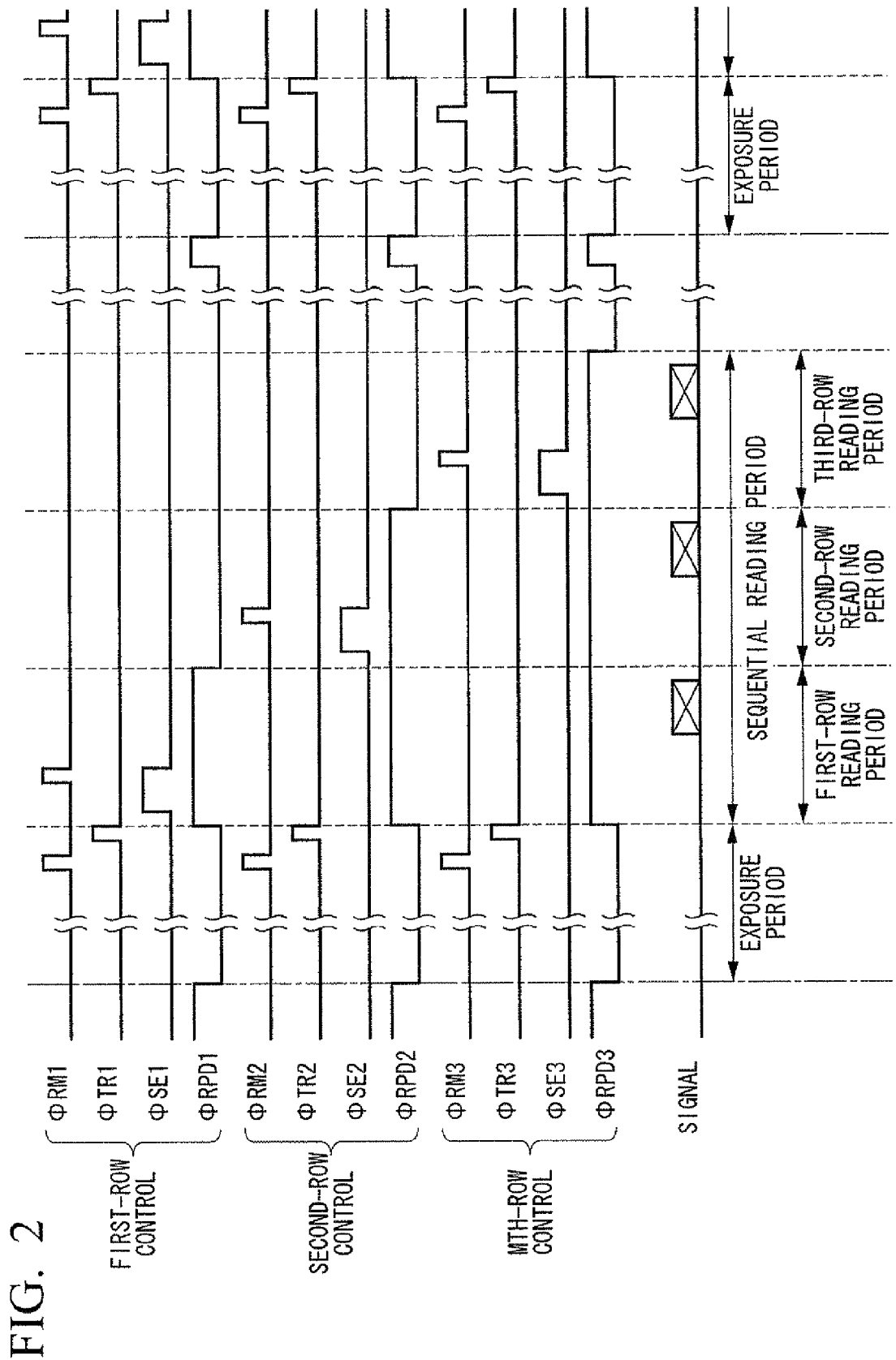
FIG. 2 is a timing chart showing the operation of the solid state imaging device in accordance with the first exemplary embodiment of the invention.

Next, the operation of the solid state imaging device shown in FIG. 1 will be described with reference to FIG. 2. First, with respect to all of the rows, the PD reset pulses φRPDi are set to "H" level, the row transmission pulses φTRi are set to "L" level, the FD reset pulses φRMi are set to "L" level, and the row selection pulses φSEi are set to "L" level, so that PD reset transistors 107 are turned on. Accordingly, the photodiodes 101 of all of the pixels are reset. The PD reset pulses φRPDi, the row transmission pulses φTRi, the FD reset pulses φRMi, and the row selection pulses φSEi are output from the vertical scanning circuit 300.

Subsequently, with respect to all of the rows, the PD reset pulses φRPDi are set to "L" level, and the PD reset transistors 107 are turned off, so that the photodiodes 101 start accumulation. When an intended accumulation time is passed, the FD reset pulses φRMi of all of the rows are set to "H" level, and the FD sections 103 are reset. Then, the row transmission pulses φTRi of all of the rows are set to "H" level, so that signal charges accumulated in the photodiodes 101 are sent to the FD sections 103. In addition, right after the completion of the transmission of the signal charges, the PD reset pulses φRPi of all of the rows are set to "H" level, so that the photodiodes 101 of all of the pixels are reset.

Subsequently, the row selection pulses φSEi for the first row are set to "H" level, so that the levels of optical signals in response to the signal charges are read out from the respective pixels of the first row. Then, the FD reset pulses φRM1 of the first row are set to "H" level, so that the reset levels of the FD sections 103 of the respective pixels of the first row are read out. In the horizontal signal reading circuit 400, differential processing between the optical signal levels and the reset levels is performed. As the differential processing is performed, output according to the signal charges occurred by the entering of light is obtained. Next, the pixel signals obtained by the foregoing differential processing are output from the output terminal 410 of the horizontal signal read circuit 400, in a time series in which the pixel signals are horizontally aligned in order. The pixel signals of the first row are output according to the foregoing operation. After the completion of the operation of reading the pixels signals of the first row, the PD reset pulses φRPD1 of the first row are set to "L" level, and the PD reset transistors 107 of the first row are turned off.

Subsequently, the same operation as on the first row is performed on the second and third rows, and accordingly, the operation of reading the pixel signals of all of the pixels is completed. After the completion of the operation of reading the pixel signals of the second row, the PD reset transistors 107 of the second row are turned off, and after the completion of the operation of reading the pixel signals of the third row, the PD reset transistors 107 of the third row are turned off.

According to the foregoing operation, the accumulation of the signals of all of the rows is started and completed at the same timing, and the global shutter operation can be realized. In addition, due to the control of the PD reset pulses φRPDi, the PD reset transistors 107 stay turned on until the pixel signals are read out. Thus, the signals are not destroyed by the blooming. After the pixel signals are read row by row, the PD reset transistors 107 are sequentially turned off row by row. It is therefore possible to reduce the period, in which the photodiodes 101 are reset, to be shorter than in the related art. This, as a result, can reduce the current of the supply voltage VDD consumed through the PD reset transistors 107.

This embodiment has been described with respect to the case in which the pixels are arrayed in three rows and three columns for the sake of simplicity. However, this is not intended to limit the present invention, but can be modified without departing from the object of the present invention. In addition, the off operation after the completion of reading the PD reset transistors 107 is not necessarily performed right after the reading of the pixel signals of that row. Rather, the off operation can be performed after the reading operation is performed on several rows. In addition, the off operation after the completion of the reading of the PD reset transistors 107 can be performed on several rows rather than on one row.

Second Embodiment

Figure 3:
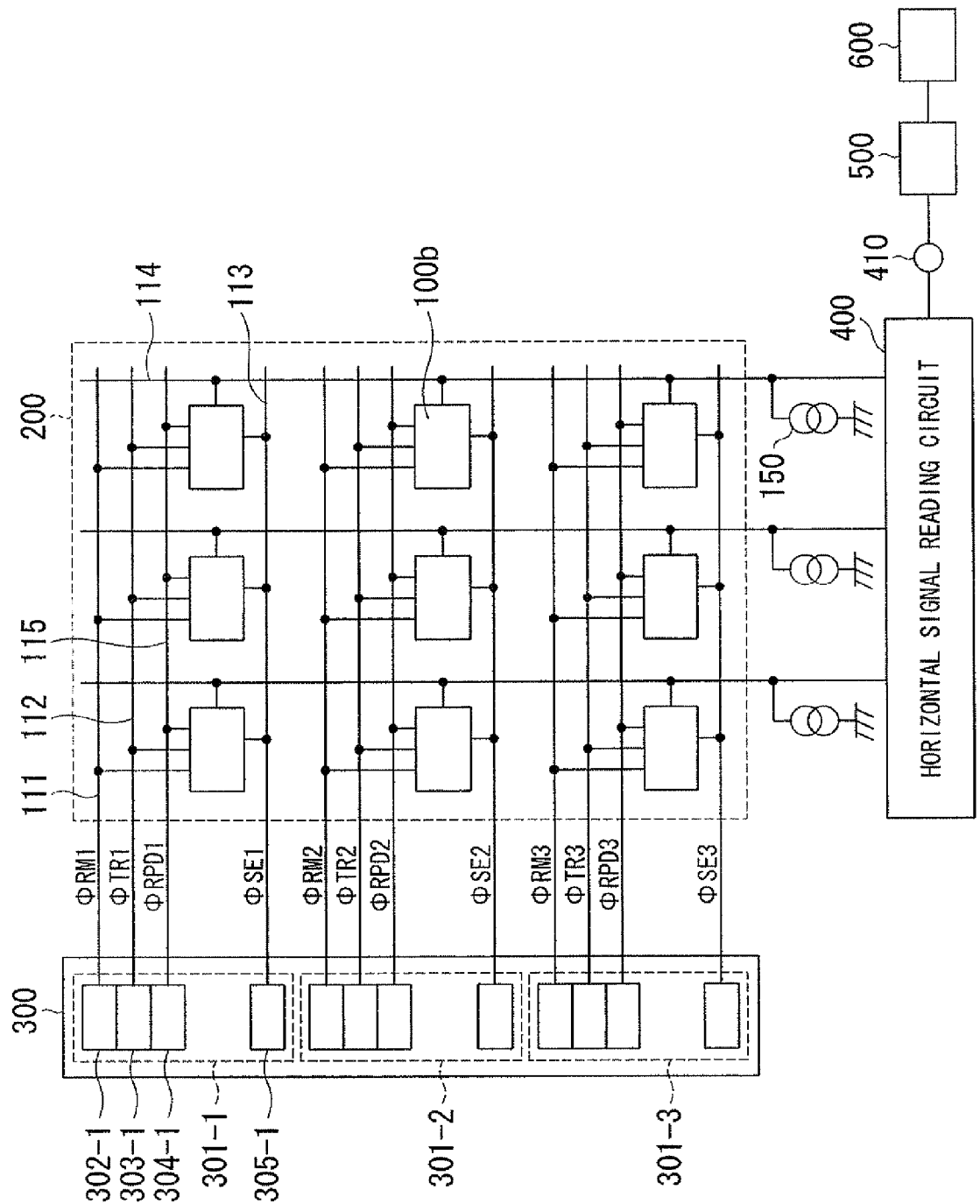
FIG. 3 is a block diagram showing the structure of a solid state imaging device in accordance with a second exemplary embodiment of the invention.

Next, a description will be given of a second exemplary embodiment of the invention. FIG. 3 shows the structure of a solid state imaging device in accordance with this embodiment. The solid state imaging device shown in FIG. 3 also has an Analog to Digital (AD) converter 500 and a frame memory 600, which are added with respect to the solid state imaging device shown in FIG. 1. Description of the other components will be omitted since they are the same as those in FIG. 1.

Below, with reference to FIG. 4, a description will be given of the operation of the solid state imaging device shown in FIG. 3. First, with respect to all of the rows, PD reset pulses φRPDi are set to "H" level, row transmission pulses φTRi are set to "L" level, FD reset pulses φRMi are set to "L" level, and row selection pulses φSEi are set to "L" level, so that the PD reset transistors 107 are turned on. Thus, the photodiodes 101 of all of the pixels are reset. The PD reset pulses φRPDi, the row transmission pulses φTRi, the FD reset pulses φRMi, and the row selection pulses φSEi are output from the vertical scanning circuit 300.

Subsequently, the FD reset pulses φRM1 for the first row are set to "H" level, and then the row selection pulses φSEi are set to "H" level, so that the reset levels of the FD sections 103 of the first row are output to the horizontal signal reading circuit 400. These reset levels are output from the output terminal 410 of the horizontal signal reading circuit 400, in a time series in which the reset levels are horizontally aligned in order. The output reset levels are AD-converted by the AD converter 500 and are retained in the frame memory 600. With respect to the second and next rows, as in the first rows, the reset levels of the FD sections 103 are read out, and the reset levels of the FD sections 103 of all of the pixels are retained in the frame memory 600.

Subsequently, the PD reset pulses φRPDi of all of the rows are set to "L" level, and the PD reset transistors 107 are turned off, so that the photodiodes 101 start accumulation. When an intended accumulation time is passed, the row transmission pulses φTRi of all of the rows are set to "H" level, and thus the signal charges accumulated in the photodiodes 101 are sent to the FD sections 103. In addition, right after the completion of the transmission of the signal charges, the PD reset pulses φRPDi of all of the rows are set to "H" level, so that the photodiodes 101 of all of the pixels are reset.

Subsequently, as in the reading of the reset levels of the FD sections 103, the row selection pulses φSEi of the first row are set to "H" level, and the optical signal levels of the first row are output to the horizontal signal reading circuit 400. The optical signal levels are output from the output terminal 410 of the horizontal signal reading circuit 400 in a time series, in which the optical signal levels are horizontally aligned in order.

The optical signal levels of the first row, output from the output terminal 410 of the horizontal signal reading circuit 400, are AD-converted by the AD converter 500. Next, only the signal components in response to the incident light are drawn by taking differences between the reset levels of the FD sections 103 of the first row and the optical levels of the first row, which are already retained in the frame memory 600.

Subsequently, the same operation as in the first row is performed on the second row and on the third row, thereby completing the operation of reading the pixel signals from all of the pixels. After the reading of the pixel signals of the second row is completed, the PD reset transistors 107 of the second row are turned off. After the reading of the pixel signals of the third row is completed, the PD reset transistors 107 of the third row are turned off.

According to the foregoing operation, the accumulation of the signals of all of the rows is started and completed at the same timing, and the global shutter operation can be realized. In addition, due to the control of the PD reset pulses φRPDi, the PD reset transistors 107 stay turned on until the pixel signals are read out. Thus, the signals are not destroyed by the blooming. After the pixel signals are read row by row, the PD reset transistors 107 are sequentially turned off row by row. It is therefore possible to reduce the period in which the photodiodes 101 are reset to be shorter than in the related art. This, as a result, can reduce the current of the supply voltage VDD consumed through the PD reset transistors 107.

In addition, this embodiment can obtain the following effects. In the solid state imaging device in accordance with the first exemplary embodiment of the invention, reset noise (hereinafter, referred to as first reset noise) occurs as the FD reset pulses φRMi are set to "H" level and the FD reset transistors 104 are turned on within the exposure period as shown in FIG. 2. The first reset noise is applied to the reset level. In addition, in the reading period of each row, reset noise (hereinafter, referred to as second reset noise) occurs as the FD reset pulses φRMi are set to "H" level and thus the FD reset transistors 104 are turned on. The second reset noise is applied to the optical signal level. Even if differential processing is performed between the optical signal levels and the reset levels in order to remove the reset noises, it is impossible to completely remove the reset noises since there is no correlation between the first and second reset noises.

Figure 4:
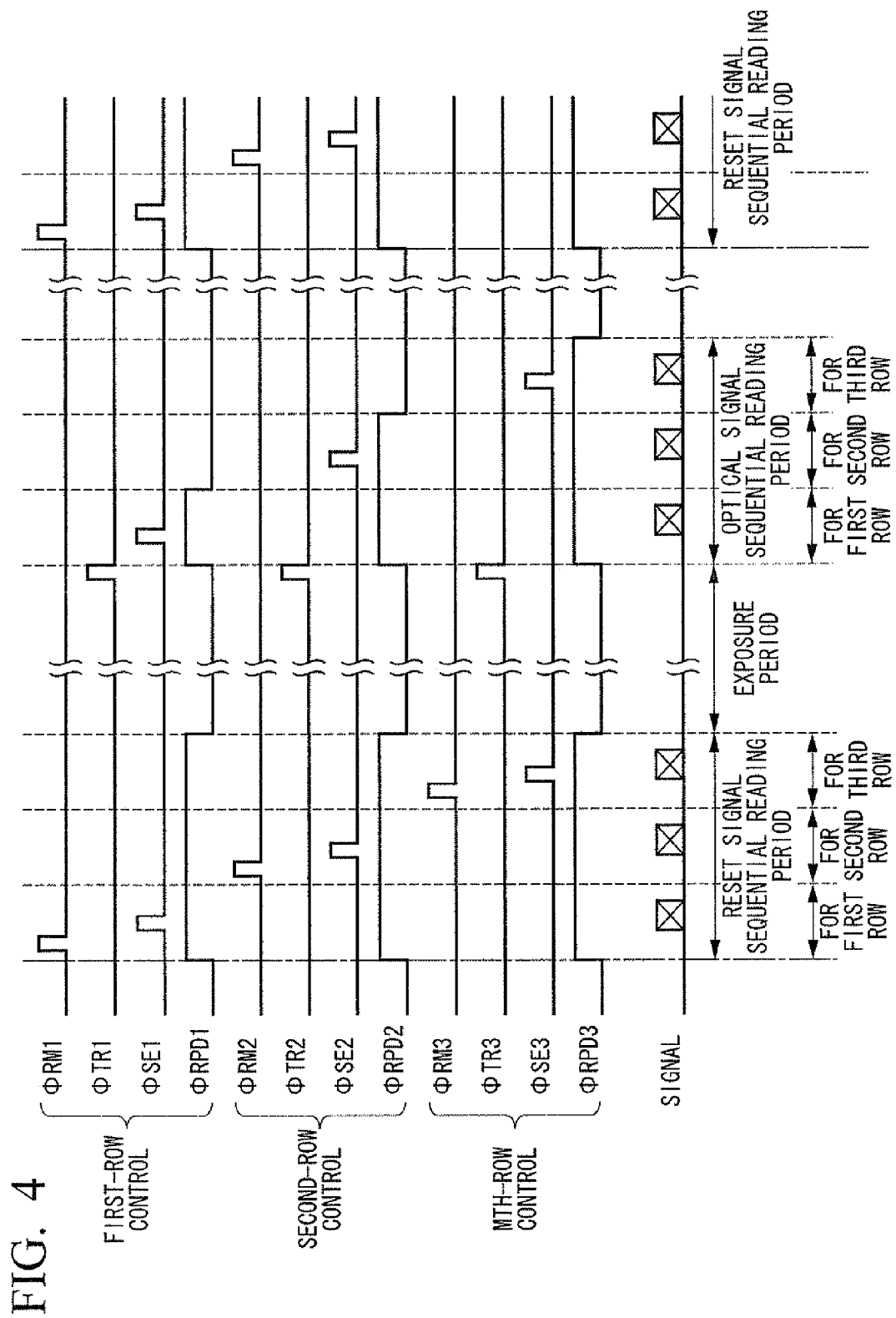
FIG. 4 is a timing chart showing the operation of the solid state imaging device in accordance with the second exemplary embodiment of the invention.
Figure 5:
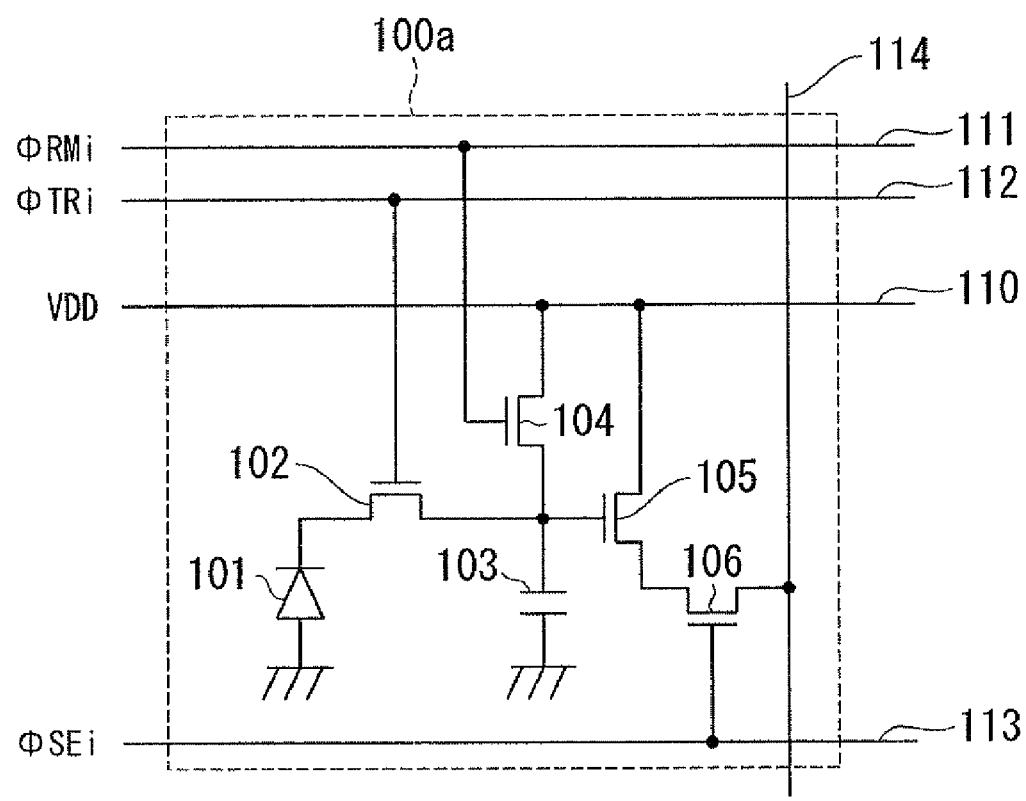
FIG. 5 is a block diagram showing the structure of a MOS solid state imaging device of the related art.
Figure 6:
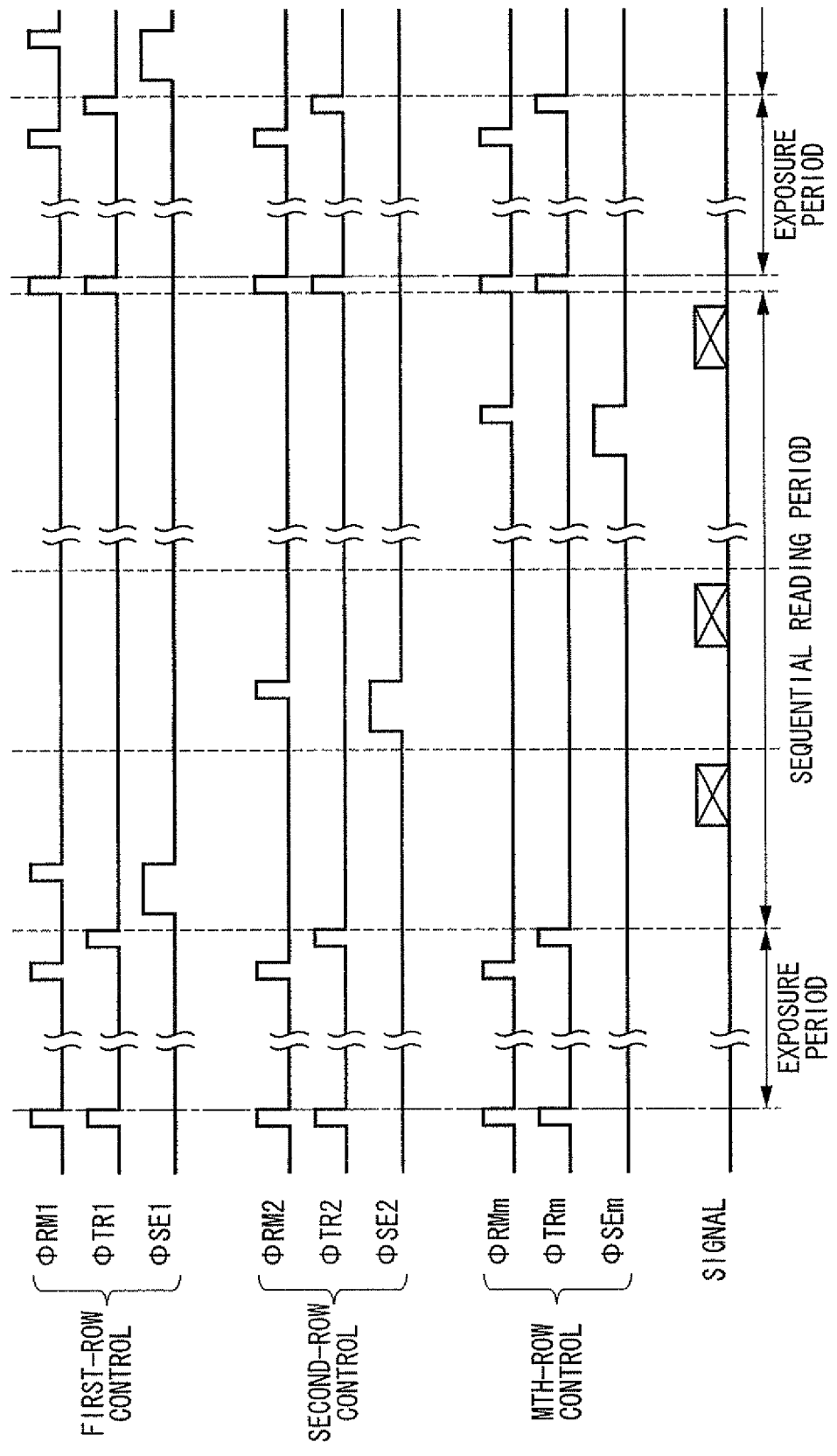
FIG. 6 is a timing chart showing the operation of the MOS solid state imaging device of the related art.

Meanwhile, in the solid state imaging device in accordance with the second exemplary embodiment of the invention, the FD reset pulses φRMi are set to "H" level in the reset signal sequential reading period shown in FIG. 4, and thus the reset noise, generated by the turning on of the FD reset transistors 104, is added to both the reset levels and the optical signal levels. Accordingly, the reset levels are removed by performing the differential processing between the optical signal levels and the reset levels, and thus it is possible to obtain higher SN signals when compared to those of the first exemplary embodiment.

This embodiment has been described with respect to the case in which the pixels are arrayed in three rows and three columns for the sake of simplicity. However, this is not intended to limit the present invention, but can be modified without departing from the object of the present invention. In addition, the off operation after the completion of reading the PD reset transistors 107 is not necessarily performed right after the reading of the pixel signals of that row. Rather, the off operation can be performed after the reading operation performed on several rows. In addition, the off operation after the completion of the reading of the PD reset transistors 107 can be performed on several rows rather than just on one row.

According to the present invention, the pixel signals can be sequentially output row by row by controlling the first reset section and the pixel signal output section independently row by row, the reset state of the photoelectric conversion elements can be canceled from the row in which the output of the pixel signals is completed. Accordingly, it is possible to reduce the period in which the photoelectric conversion elements are reset.

While the exemplary embodiments of the invention have been described with reference to the accompanying drawings, the detailed constitutions of the invention are not limited to the foregoing embodiments but embrace changes in design to the extent that they do not depart from the concept of the invention.

What is claimed is:

1. A solid state imaging device comprising:
a pixel unit which has a two dimensional matrix of pixels, in which each of the pixels arrayed in the matrix comprises;
a photoelectric conversion element which converts incident light into a signal charge and accumulates the converted signal charge,
a first reset unit which resets the signal charge accumulated in the photoelectric conversion element,
a charge retention unit which retains a signal charge output from the photoelectric conversion element,
a transmitter which transmits the signal charge accumulated in the photoelectric conversion element to the charge retention unit,
a second reset unit which resets the signal charge retained in the charge retention unit, and
an output unit which outputs a pixel signal in response to the signal charge, retained in the charge retention unit, to a vertical signal line;
a first controller which independently controls the output unit row by row so that pixel signals are sequentially output row by row to the vertical signal line; and
a second controller which independently controls the first reset unit row by row so as to reset the photoelectric conversion element when the pixel signals are output and to cancel the reset state of the photoelectric conversion element after the output of the pixel signals is completed.

* * * * *